(12) United States Patent
Choudhery (10) Patent No.: US 6,874,793 B2
(45) Date of Patent: Apr. 5, 2005

(54) VARIABLE CAMBER SUSPENSION SYSTEM

(76) Inventor: Khalid M. Choudhery, 1465 Jefferson St., Santa Clara, CA (US) 95050

( * ) Notice: Subject to any disclaimer, the term of this patent is extended or adjusted under 35 U.S.C. 154(b) by 0 days.

(21) Appl. No.: 09/858,779

(22) Filed: May 15, 2001

(65) Prior Publication Data

US 2001/0035617 A1 Nov. 1, 2001

Related U.S. Application Data

(63) Continuation of application No. 08/943,518, filed on Oct. 3, 1997, now Pat. No. 6,279,920, which is a continuation-in-part of application No. 08/754,675, filed on Nov. 21, 1996, now abandoned.

(51) Int. Cl.[7] .............................................. B60G 3/99
(52) U.S. Cl. ............................ 280/5.521; 280/86.751; 280/86.757
(58) Field of Search ......................... 280/86.75, 86.751, 280/86.752, 86.757, 5.5, 5.521, 5.52, FOR 112

(56) References Cited

U.S. PATENT DOCUMENTS

| | | | | |
|---|---|---|---|---|
| 2,279,120 A | * | 4/1942 | Hurley | |
| 3,278,197 A | * | 10/1966 | Gerin | |
| 4,371,191 A | * | 2/1983 | Goldberg et al. | |
| 4,700,972 A | * | 10/1987 | Young | 280/5.521 |
| 4,835,714 A | * | 5/1989 | Sano et al. | 364/551.01 |
| 4,971,348 A | * | 11/1990 | Oyama et al. | |
| 5,438,515 A | * | 8/1995 | Miichi et al. | 280/5.521 |
| 5,481,458 A | * | 1/1996 | Harara et al. | 364/424.05 |

FOREIGN PATENT DOCUMENTS

| | | | | |
|---|---|---|---|---|
| GB | 2271968 | * | 5/1994 | |
| JP | 62-268770 | * | 11/1987 | |
| JP | 62-268773 | * | 11/1987 | |
| SU | 1240675 | * | 6/1986 | 280/FOR 112 |

* cited by examiner

*Primary Examiner*—Eric Culbreth
(74) *Attorney, Agent, or Firm*—Raymond E. Roberts; Intellectual Property Law Offices (57) ABSTRACT

A dynamically acting variable camber suspension system (50) having a sensor (56), a controller (58), and camber adjusters (60) associated with each wheel (54) which is employing the VCSS (50) in a vehicle (52). The VCSS (50) detects lateral force acting upon the vehicle (52) when it is turning with the sensor (56), calculates the appropriate dynamic response with the controller (58), and uses the camber adjusters (60) to set negative camber for outside wheels (54) and positive camber for inside wheels (54) in a manner such that road contact points (70) of the wheels (54) are spaced to balance normal forces and footprints (74, 76) of the wheels (54) are equalized to maximize frictional forces.

18 Claims, 4 Drawing Sheets

VARIABLE CAMBER SUSPENSION SYSTEM

CROSS-REFERENCES TO RELATED APPLICATIONS

This application is a continuation of U.S. patent application Ser. No. 08/943,518, filed Oct. 3, 1997, now U.S. Pat. No. 6,279,920 which is a continuation-in-part and claims benefit of U.S. patent application Ser. No. 08/754,675, filed Nov. 21, 1996 abandoned, converted to a U.S. Provisional Patent Application on Jul. 1, 1997, and now abandoned.

TECHNICAL FIELD

The present invention relates generally to land vehicles, and more particularly to dynamic adjustment of wheel camber of the suspension systems of motorized land vehicles. The inventor anticipates that primary application of the present invention will be for automobiles and trucks, but the present invention is also well suited to use in any vehicle having at least one set of transversely opposed wheels.

BACKGROUND ART

Modern vehicle suspension systems can be quite complex assemblies, adapting as they must from static conditions of the vehicle at rest (and even there with a range of possible loads) through dynamic conditions imposed in travel by road surface, road slope and pitch and turns, external forces like wind gusts, vehicle speed, load shifts, and all possible combinations of these. To adapt to such conditions most vehicle suspensions to date have employed characteristics like camber, caster, and toe which are set to particular values, the suspension locked in some manner to maintain these values, and then those characteristics not intentionally changed. This system of static suspension setup is an understandable attempt to simplify the complex mechanism used to address the dynamic environment encountered in driving.

The key characteristics of suspension systems are camber, toe, and caster. For the following discussion camber is the most important, it refers to the vertical tilt of a wheel either toward or away from the vehicle center. On a vehicle having opposed transversely paired wheels, like an automobile, when a wheel is tilted top inward the wheel is said to have negative camber, and when it points top outward it is said to have positive camber. Similarly, changes in the camber of a wheel may be referred to as being more negative or more positive.

In contrast, toe is the horizontal tilt of paired wheels either together or apart. When the fronts of the wheels tilt inward the wheels are said to have toe-in, and when they point outward they are said to have toe-out. It should be noted that toe deals with a characteristic of wheel orientation which is both horizontal and longitudinal relative to the vehicle. Caster is the forward (negative caster) or rearward (positive caster) tilt of the steering axis of a wheel. For example, in most bicycles the front fork is almost always mounted tilted back, giving the front wheel positive caster. It should be noted that caster deals with a characteristic of wheel orientation which is both vertical and longitudinal relative to the vehicle. Finally, track is the separation between transversely separated wheels. Track is not usually discussed as a suspension setup characteristic, but it is important in the following discussion.

Figure 1:
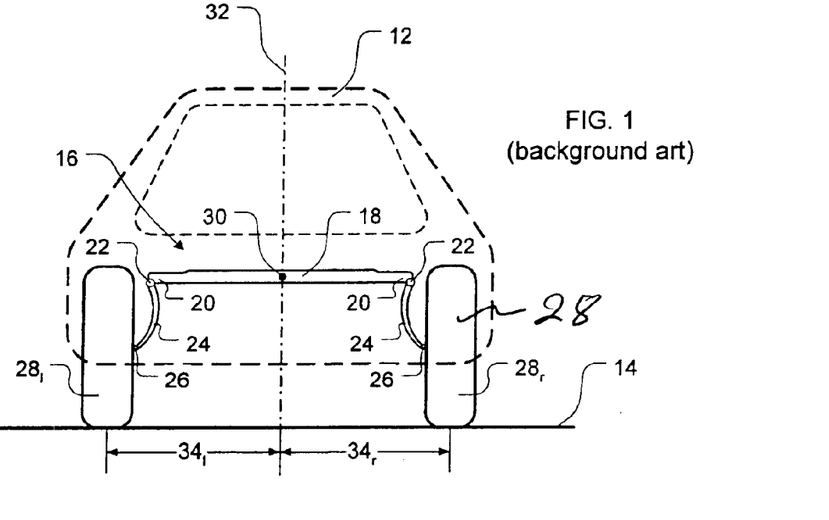
FIG. 1 (background art) depicts a conventional vehicle and suspension system on a horizontal road, and the major germane components therein.

FIG. 1 (background art) depicts a vehicle 12 (in ghost outline) on a horizontal road 14. The vehicle 12 has a conventional suspension system 16 which includes a spacing member 18, which in actuality may be a more complex assembly than is shown. The spacing member 18 has a fixed horizontal displacement between its opposed ends 20. At each end 20 a joint 22 is provided where the upper end of an arm 24 is attached. At the lower end of each arm 24 is a spindle 26, upon which a wheel 28 is rotatably mounted (denoted as a left wheel $28_l$ and a right wheel $28_r$ in the figures; typically the wheels 28 will include tires, but the discussion herein will not generally treat these separately). In FIG. 1 the wheels 28 are shown oriented to true vertical (i.e., zero camber). The vehicle 12 further includes a center of gravity "CG 30," which for the present discussion will always be assumed to be fixed at the transverse center of the vehicle 12. A vertical center axis 32 is projected through the CG 30 to the road 14, thereby dividing the overall track at the illustrated end of the vehicle 12 into a left track $34_l$ and a right track $34_r$. The suspension system 16 is depicted simplistically here with components like springs, steering linkages, etc. omitted to facilitate clarity. Thus, FIG. 1 depicts what has been considered proper wheel alignment and suspension setup during much of human history.

Figure 2:
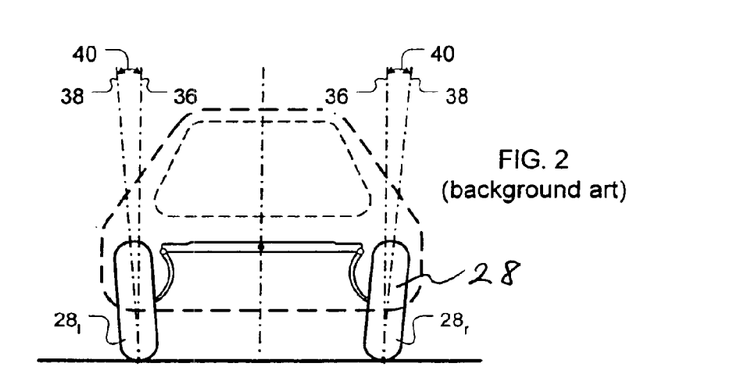
FIG. 2 (background art) illustrates the vehicle of FIG. 1 at rest, with the suspension system set up in a typical modem manner.

FIG. 2 (background art) illustrates the vehicle 12 at rest with the suspension system 16 set up in a conventional modern manner. The tops of the wheels 28 are tilted outward (somewhat exaggerated for illustration), away from the spacing member 18. To emphasize this a pair of vertical side axes 36, a pair of wheel axes 38, and a pair of arcs 40 are provided to depict the angular separation of these. FIG. 2 thus depicts positive camber. Today a slight amount positive camber is considered desirable by many manufacturers (e.g., Ford Motor company in most of its automobiles; but Daimler Benz is a counter example, using slightly negative setup camber in many Mercedes Benz automobiles). Slightly pre-loading camber away from zero in this manner is motivated by the modern use of flexible components like springs and inflated rubber tires, and the goal of maintaining the camber of the suspension system 16 within a useful range during vehicle 12 use, say, a range extending from slightly positive to zero to negative.

Figure 3:
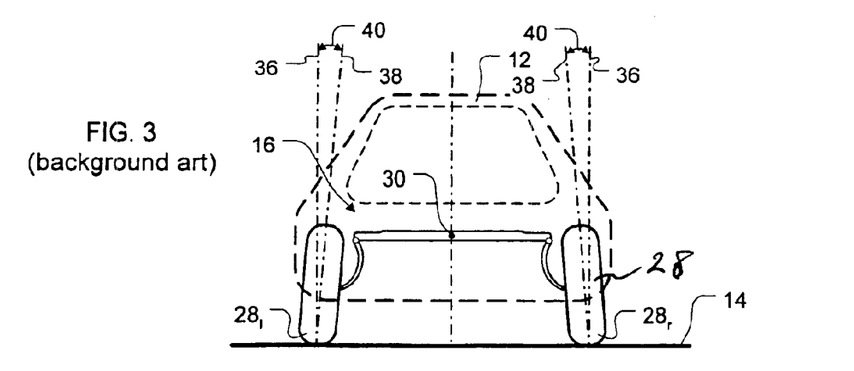
FIG. 3 (background art) illustrates the vehicle and the suspension system of FIG. 2 when traveling straight at highway speed.

Many factors affect wheel 28 orientation when the vehicle 12 is moving, with some obvious examples having already been mentioned, such as passenger and cargo loading. However, less obvious factors must also be considered, such as the natural tendency of non-driving wheels 28 to spread outward at high speed. FIG. 3 (background art) therefore illustrates the vehicle 12 and its suspension system 16 when engaged in typical straight forward motion at highway speed. The slightly positive camber of FIG. 2 has now become slightly negative.

Figure 4:
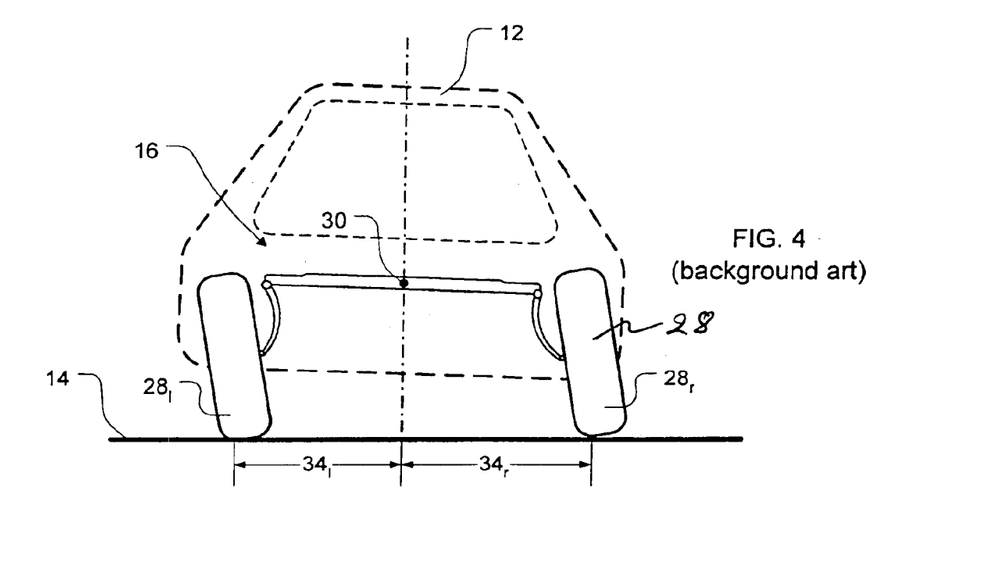
FIG. 4 (background art) illustrates the vehicle and suspension system during a hard unbanked turn to the right.

FIG. 4 (background art) illustrates the suspension system 16 as the vehicle 12 makes a hard unbanked turn to the right. A number of changes can be observed: the camber of the left wheel $28_l$ is now positive, the camber of the right wheel $28_r$ is somewhat more negative, and the left track $34_l$ and the right track $34_r$ are no longer equal. There are a number of factors that interact to bring about these changes. A typical lay person might say that the vehicle 12 is "leaning into the turn" and that the wheels 28 (i.e., the tires) are scrubbing the road.

Figure 5:
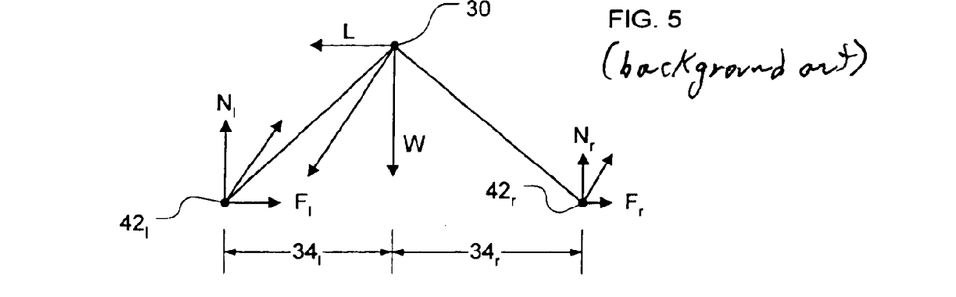
FIG. 5 (background art) is a free body diagram depicting the forces present in the scenario depicted in FIG. 4.

FIG. 5 (background art) is a free body diagram depicting the forces present in the scenario depicted in FIG. 4. At this point it is assumed that the vehicle 12 is not in such an extreme situation that it is skidding or has lifted a wheel 28 off the road 14. The vehicle 12 is reduced here to three rigidly connected points: a left road contact point $42_l$, a right road contact point $42_r$, and the previously noted CG 30. The vehicle 12 has weight (W), depicted by a vector vertically extending out of the CG 30. Countering the weight (W) are a left normal force ($N_l$) and a right normal force ($N_r$), respectively depicted by vectors vertically extending out of the left road contact point $42_l$ and the right road contact point $42_r$. The vehicle 12 also has a lateral force (L) effectively acting on the CG force (L) are a left friction force ($F_l$) and a right friction force ($F_r$), respectively depicted by vectors horizontally extending out of the left road contact point $42_l$ and the right road contact point $42_r$. Finally, resultant vectors are shown at all three points (30, $42_l$, and $42_r$).

Figure 6A:
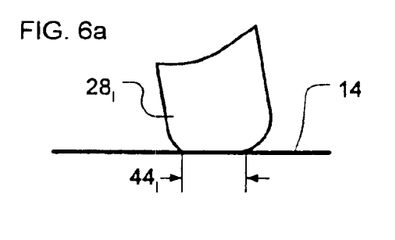
FIGS. 6a–b respectively depict close-ups of the left and right wheels as they make road contact in the scenario of FIG. 4.
Figure 6B:
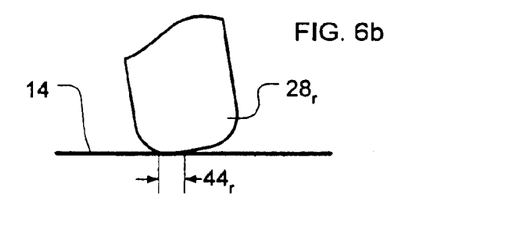

Turning now also to FIG. 6a–b, these respectively depict close-ups of the left wheel $28_l$ and the right wheel $28_r$ as they contact the road 14 in the scenario of FIG. 4. In particular, it should be noted that the road 14 surface contact of the left wheel $28_l$ and the right wheel $28_r$ are not the same, a left footprint $44_l$ here is greater than a right footprint $44r$. The net result is as depicted in FIG. 5, where the left friction force $F_l$ is shown with a longer vector than the right friction force $F_r$, because the left friction force $F_l$ is markedly greater than the right friction force $F_r$ (i.e., $F_l >> F_r$).

Friction has two forms, static and dynamic. Static friction is exhibited as a force resisting motion beginning (in the example, resistance to the vehicle 12 skidding). However, static friction always has an upper limit determined by the particular materials being brought into contact (the road 14 and wheels 28 here), and once that limit is exceeded movement begins (if only one wheel 28 is affected, then it scrubs the road 14; but if all wheels 28 at an end of the vehicle 12 are affected, then that end skids off the road 14). In contrast, dynamic friction is exhibited as a force countering motion once it has begun, and in most cases it is less than static friction. Therefore, to obtain maximum benefit from friction the obvious course is to keep maximum wheel 28 surface in contact with the road 14 by keeping the left friction force $F_l$ add the right friction force $F_r$ as equal as possible (which also helps keep the friction at any particular wheel 28 below the static friction limit). In the argot of automobile racing this can be stated: all of the rubber needs to meet the road. Herein lies one problem with the prior art; conventional suspensions systems today do a poor job maintaining optimal friction distribution between the wheels 28.

In FIG. 5 the left normal force ($N_l$) is shown as being much greater than the right normal force ($N_r$). This is correct because the lateral force (L), operating on the CG 30, applies torque to the vehicle 12. This can be confirmed with analysis with classical mechanics, which will also reveal that if the difference between the left normal force ($N_l$) and the right normal force ($N_r$) become too great the right wheel $28_r$ will lift off of the ground (assuming that static friction is not overcome first, and the laterally static example here does not turn into a dynamic one; i.e., the vehicle 12 does not simply skid off the road 14 first). In such a situation, if the driver does not quickly enough reduce the lateral force (L), say by decreasing how sharply the vehicle 12 is being turned, the vehicle 12 will roll over. Thus, also in the argot of racing, once the rubber meets the road it needs to stay there. Herein lies another problem with the prior art; conventional suspensions systems today do a poor job maintaining optimal normal force distribution between the wheels 28.

Up to this point static setup of suspension systems has been discussed, because such is still overwhelmingly used today. However, a statically set suspension cannot produce optimum response in all driving situations. That necessarily requires a system which is dynamically able to respond. Many dynamically controlled suspension systems have been attempted, and discussion of the major ones known to the inventor follows.

One set of dynamic efforts has used detection of the steering wheel or else of the steering assembly to control wheel camber. Miichi et al. in UK patent 2,271,968 teach use of hydraulic actuators to adjust toe and camber in response to steering angle. Harara et al. in U.S. Pat. No. 5,481,458 teach a caster angle control apparatus similarly using steering wheel angle. Abe in Japanese patent 62-268773 teaches camber adjustment of rear vehicle wheels based upon front wheel steering angle as detect at the steering wheel. And Oyama et al. (including Abe) in U.S. Pat. No. 4,971,348 teach an enhanced version of Abe '773, but still one for adjustment of rear wheel characteristics only, and one again based upon front wheel steering angle as detected at the steering wheel.

For completeness more than relevance, Sano et al. in U.S. Pat. No. 4,835,714 teach setting toe and camber in relation to vehicle speed. And Gerin in U.S. Pat. No. 3,278,187 teaches a mechanism for changing elevation of the vehicle. FIG. 3 of Gerin '187 is interesting because it shows a vehicle in a hard left turn with the wheels adjusted contrary to the conventional orientations, but this is accomplished with simple height adjustment rather than by changing wheel camber angles.

Other dynamic efforts have used various force sensors and camber adjustment of all of the wheels of the vehicle. Goldberg et al. in U.S. Pat. No. 4,191,274 and in U.S. Pat. No. 4,371,191 (a continuation-in-part of '274) teach a complex system for adjustment of a number of suspension characteristics, including camber, based upon computation of vehicle roll attitude and use of a number of possible sensors, including a centrifugal force sensor. And Serizawa in Japanese patent 62-268770 teaches the use of lateral acceleration detecting means for adjustment of all four vehicle wheels to zero or slightly negative camber.

Of the above, the Goldberg '274 and '191 and the Serizawa '770 efforts are most relevant here. As noted, Goldberg '274 and '191 use very complex systems, employing large numbers of components and concurrently attempting to control camber, caster, toe, vehicle height, and "wheel height" (a misnomer actually referring to vehicle height in relation to a wheel, the dimensions of the wheel itself are not adjusted). In contrast, Serizawa '770 is elegantly simple, but it is limited to setting camber to zero or slightly negative, i.e., it "maintains" camber near static suspension system ideals, rather than employing it fully to counter skids and rolls, and to enhance vehicle turning ability.

In sum, all prior art techniques have used camber adjustment as if the goal were merely to achieve equivalence to static suspension system setup for straight forward driving (i.e., to convert the situation depicted in FIG. 4 (background art) into one of those depicted in FIGS. 1–3 (background art)). This will equalize the left footprint $44r$ and the right footprint $44r$, and the left track $34_l$ and the right track $34_r$, but because of lateral force (L, in FIG. 5) this will not optimally balance the left normal force ($N_l$) and a right normal force ($N_r$) in turns, which is also necessary to achieve optimum cornering capability and safety.

DISCLOSURE OF INVENTION

Accordingly, it is an object of the present invention to provide a safer vehicle suspension system, one which provides better vehicle turning stability by reducing the tendency for skids or loss of traction at any wheels, and the tendency for vehicle roll.

Another object of the invention is to provide a vehicle suspension system capable of greater cornering speeds.

Another object of the invention is to provide a vehicle suspension system in which component wear and stresses are more balanced.

And, another object of the invention is to provide a vehicle suspension system which is more enjoyable for drivers and which instills in them confidence in their ability to control the vehicle.

Briefly, one preferred embodiment of the present invention is a suspension system for vehicles having one or more sets of transversely opposed wheels. One or more sensors detect lateral force acting upon the vehicle and permit a controller to calculate appropriate negative cambers for outside wheels and positive cambers for inside wheels when the vehicle is turning. The controller then dynamically operates camber adjustment mechanisms at each wheel in the wheel sets using the invention.

An advantage of the present invention is that is simple to implement, using a relatively small number of components which may be chosen among a wide variety of types. In its simplest form the invention uses only a sensor, a controller, and two camber adjusters (one at each wheel in a single transversely opposed set at one end of a vehicle that uses the invention at only one longitudinal end). Further, the sensor may be any of various types for detecting lateral force; the controller can be a single unit, distributed units, or even integrated into existing control units in the vehicle; and the camber adjusters can be any of various hydraulic, pneumatic, or electrical types.

Another advantage of the invention is the variety of vehicles in which it may be employed. It can be used in conventional four-wheel vehicles, either at the front wheel, at the rear wheels, or at all four wheels. It can be used in three-wheel vehicles, either just at the opposed wheels, or also on the unopposed third wheel also. And it can be used on vehicles having even greater numbers of wheels, such as train cars. In particular, the invention is well suited for use on very light vehicles, where relatively high centers of gravity are common due to passengers and cargo, and which increases the danger of skids and roll overs.

And, another advantage of the invention is that it making driving more enjoyable. It increases the cornering capability of vehicles, which drivers may employ for recreational driving at higher speeds, or simply for increased confidence and less stressful driving. The invention also lends itself well to integration with an alarm subsystem which can calculate when a vehicle is approaching the limits of safety and accordingly warn the driver before such limits are exceeded.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 7 illustrates the invention as well as its major components mounted in a vehicle which is at rest, while

BEST MODE FOR CARRYING OUT THE INVENTION

A preferred embodiment of the present invention is a variable camber suspension system ("VCSS"). As illustrated in the various drawings herein, and particularly in the view of FIG. 7, a form of this preferred embodiment of the inventive device is depicted by the general reference character 50.

Figure 7:
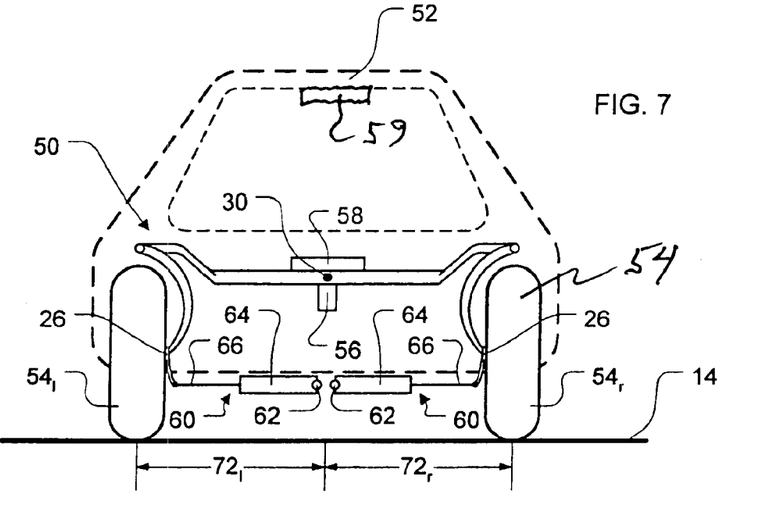

FIG. 7 illustrates the inventive VCSS 50 in a vehicle 52 (shown in ghost outline in the figures), similar to the vehicle 12 of FIG. 1 in many regards and component references (which will be reused where appropriate). However, in the inventor's preferred embodiment wheels 54 with more rounded profiles are used (denoted as left wheel $54_l$ and a right wheel $54_r$ in the figures; typically the wheels 54 include tires, but the discussion herein will generally not treat these separately). FIG. 7 also illustrates the major components of the inventive VCSS 50. Included are a sensor 56, a controller 58, and a set of camber adjusters 60.

In the preferred embodiment a single pendulum type sensor 56 is mounted near the CG 30 of the vehicle 52. The pendulum of the preferred sensor 56 moves only transversely in relation to the vehicle 52, so that only lateral forces acting upon the vehicle 52 are sensed, such as those encountered in a turn or from some wind gusts. Multiple sensors 56 and other types of sensors 56 (e.g., spring loaded masses with capacitive or inductive or even resistive electrical characteristics used for positional detection, etc.) may also be used, and they can be mounted elsewhere.

Similarly, the controller 58 may be placed anywhere convenient in the vehicle 52, or its functionality may be distributed among multiple units, or it may even be integrated into other control units present in the vehicle 52. The controller 58 receives the output of the sensor 56, calculates the net forces operating upon the vehicle 52, and controls the camber adjusters 60 accordingly. Additional capabilities can also be integrated into the controller 58. For example, the controller can be used to activate an audible or visible alarm 59 when the vehicle 52 is approaching the limits of safe driving (and even with the inventive VCSS 50 there will always be ultimate limits). Alternately, the controller 58 can be used to accumulate statistics for monitoring the driving performance and responsibility of commercial drivers, or to better schedule component maintenance. Further, by using non-volatile memory and by sufficiently "armoring" at least the memory components where the most recently acquired of such statistical data is stored, the controller 58 can provide a data recorder capability for post crash analysis (much like "black box" data recorders are currently used for airplane crash analysis), i.e., the controller 58 can be housed in a robust vessel.

FIG. 7 includes some elements as schematic representations. For example, the sensor 56, controller 58 and alarm 59 are all represented merely as boxes.

A camber adjuster 60 is typically (but not necessarily) associated with each wheel 54 of the vehicle 52. However, a key point is that the vehicle 52 must employ at least one set of transversely opposed wheels 54 to use the VCSS 50. Thus, the vehicle 52 in FIG. 7 may by of a four-wheeled type, and it may (but not necessarily) have camber adjusters 60 present on the other two wheels 54 as well. Alternately, the vehicle 52 may be of a three-wheeled type (common in some countries outside North America and Europe), and it may (but not necessarily) have another camber adjuster 60 present on the third wheel 54. Furthermore, vehicles 52 having still other arrangements of wheels 54 may employ the inventive VCSS 50 also. An obvious example is a tractor-trailer truck type vehicle 52, having four or more sets of opposed wheels. And a less obvious example envisioned by the inventor is use of the VCSS 50 on train cars (which employ wheels different from those in the figures used herein).

In the illustrated embodiment, the camber adjuster 60 includes a mount 62, an actuator 64, and an actuator rod 66 extending out of the actuator 64. The mount 62 pivotally attaches the camber adjuster 60 to the vehicle 52, while the extended end of each actuator rod 66 pivotally connects to a control arm 68 (FIG. 7a) provided for this purpose, which is attached to the lower end of the arm 24 and to the spindle 26 of the wheel 54 assembly.

Figure 7A:
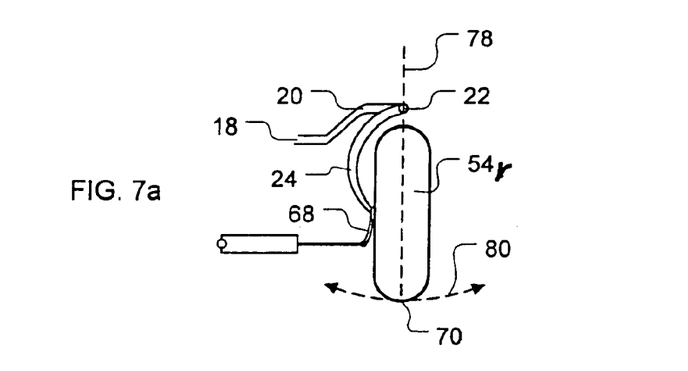
FIG. 7a depicts particular features regarding the radius of potential wheel movement in FIG. 7.

Each camber adjuster 60 present is used to separately adjust the camber of the associated wheel 54 under direction of the controller 58, by extending the actuator rod 66 out of or retracting it back into the actuator 64. The actuator 64 and the actuator rod 66 may be a conventional pneumatic or hydraulic cylinder, an electrical unit such as a solenoid or linear armature, or a rotary motor driven rack and pinion or ball drive.

FIG. 7a depicts some additional features of the VCSS 50 in the preferred embodiment. The end 20 of the spacing member 18 is extended so that the joint 22 which the arm 24 attaches to is directly above the wheel 54. A radius 78 is shown extending from the pivotable joint 22 to a road contact point 70, and an arc 80 depicts potential pivotal movement of the wheel 54 by the camber adjuster 60. By arranging the components of the VCSS 50 in this manner the CG 30 tends to be lowered slightly in turns and the vehicle 52 tends to stay more level, both of which are desirable. It should also be noted that the preferred embodiment of the VCSS 50 operates by adjusting the camber either at the arm 24 or as shown at the control arm 68 (termed lower arm adjustment; which causes pivotal rotation of the wheel about an axis above the wheel). In contrast, all prior art known to the inventor uses (upper arm) adjustment of the camber by pivoting the wheel 28 about some lower point and by lengthening or shortening the end 20 of the spacing member 18 assembly in some manner. This is disadvantageous because it unduly limits the range of possible camber adjustment, it does not permit radial wheel movement in the manner described above, and it may cause shifting of the body of the vehicle 12 in an undesirable manner in turns.

Figure 8:
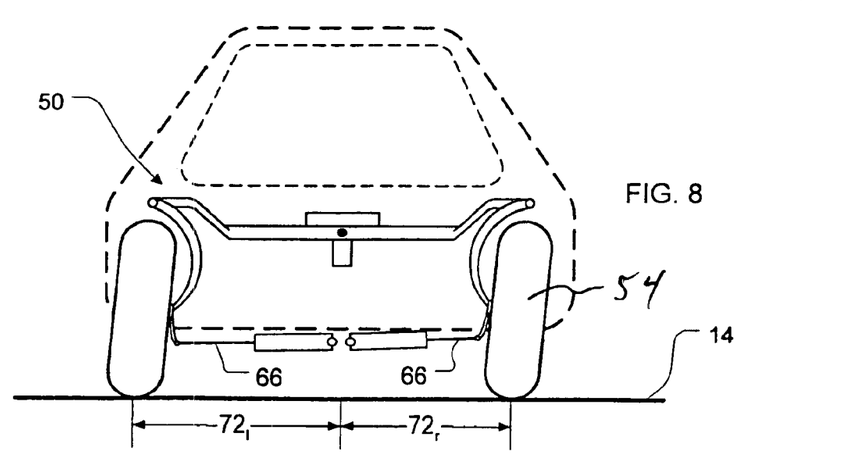
FIG. 8 depicts the vehicle of FIG. 7 during a hard unbanked turn to the right, i.e., the same turn as in FIG. 4 but with the invention now in use.

FIG. 8 depicts the situation when the vehicle 52 makes a right turn (e.g., the very same right turn which the vehicle 12 made in FIG. 4). Here the left wheel 54$_l$ is outside and the right wheel 54$r$ is inside in the right hand turn being attempted. It can readily be seen that by extending the actuator rod 66 affecting the left wheel 54$_l$ and by retracting the actuator rod 66 affecting the right wheel 54$r$ that the orientations of the wheels 54 are made markedly different from those of the wheels 28 in FIG. 4 As discussed in the Background Art section, the scenario in FIG. 4 is undesirable because it produces uneven allocation of frictional and normal forces. As will now be discussed, the inventive VCSS 50 overcomes both of these deficiencies of the prior art.

Figure 9:
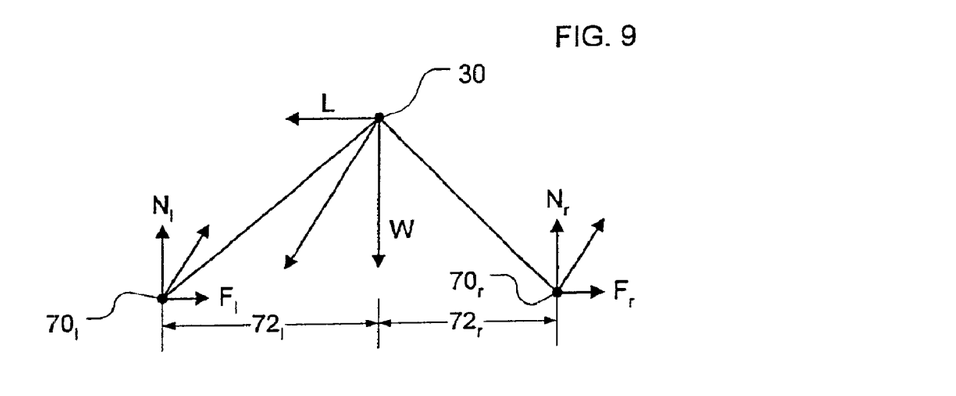
FIG. 9 is a free body diagram depicting the forces present in the scenario depicted in FIG. 8.

FIG. 9 is a free body diagram for the vehicle 52 of FIG. 8. The vehicle 52 is reduced here to three rigidly connected points: a left road contact point 70$_l$, a right road contact point 70$_r$, and the previously noted center of gravity, CG 30. The vehicle 52 has weight (W), countered by a left normal force ($N_l$) and a right normal force ($N_r$). The vehicle 52 also has a lateral force (L), countered by a left friction force ($F_l$) and a right friction force ($F_r$). And resultant vectors are shown at all three points (30, 70$_l$, and 70$_r$).

In FIG. 9 the normal forces ($N_l$ and $N_r$) are shown as balanced. This result is achieved because the torque of the lateral force (L) on the CG 30 is countered by the left track 72$_l$ here being greater than the right track 72$_r$ (opposite the situation in FIGS. 4–5). While maintaining such a balance may not always be possible, or even desirable in some cases, it is clear that the VCSS 50 permits controlling the normal forces ($N_l$ and $N_r$) much better Accordingly the tendency of the vehicle 52 to roll can be kept to a minimum.

In FIG. 9 the friction forces ($F_l$ and $F_r$) are also shown as balanced, which is optimal. Accordingly, the tendency of the vehicle 52 to skid can also be kept to a minimum.

As previously noted, the wheels 54 used in the preferred embodiment (as contrasted with the wheels 28) have a more rounded profile. This permits equivalent wheel 54 footprints to be maintained during a wider range of turning sharpness, which the inventive VCSS 50 now permits. Although the VCSS 50 has a potentially much broader range of application, it is one of the inventor's initial goals to facilitate development of fully highway capable vehicles which are very small and lightweight, and hence more economical. For this purpose tires similar to those on conventional motorcycles may therefore be used on the wheels.

Figure 10A:
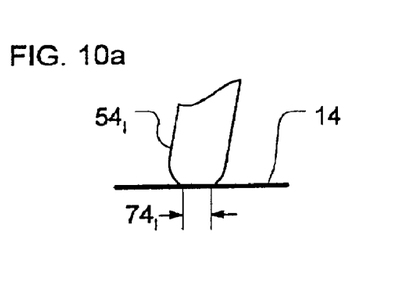
FIGS. 10a–b respectively depict close-ups of the left and right wheels as they make road contact in the scenario of FIG. 8.
Figure 10B:
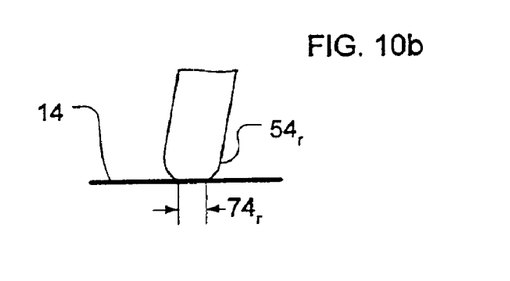
Figure 11A:
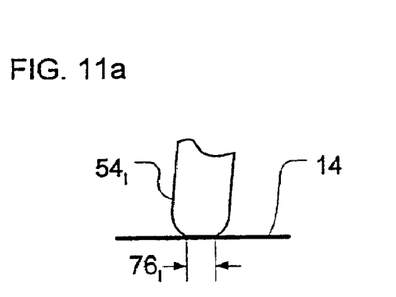
FIGS. 11a–b respectively depict close-ups of the left and right wheels as they make road contact in a less extreme right turn than that depicted in FIG. 8.
Figure 11B:
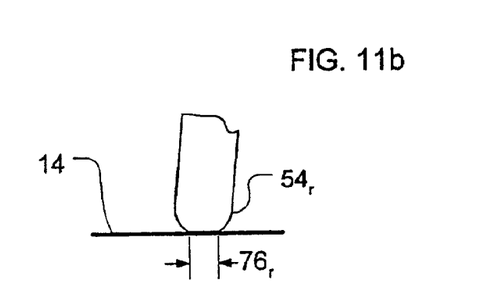

FIGS. 10*a–b* depict close-ups of the left wheel 54$_l$ and the right wheel 54$r$ as they contact the road 14 in the scenario of FIG. 8. A left footprint 74$_l$ and a right footprint 74$r$ which are roughly equal result here, i.e., an optimum situation for the distribution of friction. In comparison, FIGS. 11*a–b* depict close-ups of the left wheel 54$_l$ and the right wheel 54$r$ as a less sharp right turn is attempted. This produces a left footprint 76$_l$ and a right footprint 76$r$ which are again roughly equal (and optimum). FIGS. 10*a*–and 11*a–b* thus are in stark contrast to FIGS. 6*a–b*, where the profiles of the wheels 28 and the orientations which they are in will not permit optimal balance of the friction forces present.

Conventional suspension systems 16 to date have sought to bring and maintain the cambers of wheels 28 to roughly static set up or straight forward travel norms. This is within a range of 2–3 degrees negative to 2–3 degrees positive at most, with opposed wheels having the same sense (i.e., both positive or negative). It is the present inventor's position that such a small range is not adequate to respond to typical turns encountered by a vehicle and that the use of much greater ranges, say 10–45 degrees, and possibly even greater in some applications, is beneficial when used with opposite senses (i.e., one wheel having negative camber and having positive camber).

In addition to the above mentioned examples, various other modifications and alterations of the inventive VCSS 50 may be made without departing from the invention. Accordingly, the above disclosure is not to be considered as limiting and the appended claims are to be interpreted as encompassing the true spirit and the entire scope of the invention.

INDUSTRIAL APPLICABILITY

The present VCSS 50 is well suited for application in motor vehicles because it promotes safer control of vehicles by preventing skids and roll-overs; it promotes better distribution of wear, and thereby long useful life of suspension components and tires; and it promotes more enjoyable driving The VCSS 50 is usable on the full range of vehicles having transversely opposed wheels, e.g., four-wheel vehicles like automobiles and pickup trucks, through train cars, and potentially even larger vehicles. In the case of automobiles, the VCSS 50 may readily be used on designs which are standard sized. However, one of the inventors' primary goals that the inventive VCSS 50 also be used in a new class of smaller, lighter, and more economical vehicles, which are currently in development. In many parts of the world such a new class of vehicle would be welcomed. Unfortunately, to date, development of such vehicles is being stifled by two factors. There is consumer reluctance to purchase vehicles which deviates too much from the general structure of the automobile, and in some governments also reluctance to permit such to share the roadways with conventional traffic. This has compelled automobile manufactures to not deviate too far the automotive norm. And this has raised the second factor, the difficulty of constructing small automobile-like vehicles, particularly the suitability of suspensions that work efficiently and safely in such. The VCSS 50 is particularly able to fill this role.

For the above, and other, reasons, it is expected that the VCSS 50 of the present invention will have widespread industrial applicability. Therefore, it is expected that the commercial utility of the present invention will be extensive and long lasting.

What is claimed is:

1. A suspension system for a vehicle having at least one set of transversely opposed wheels which may each rotate about a rotational axis, comprising:

sensor means for detecting lateral force acting upon the vehicle;

adjustment means for adjusting camber of each of the wheels, wherein said adjustment means pivots the wheel about a pivot axis located above the rotational axis by displacing the wheel laterally at a point below the rotational axis; and a controller capable of receiving output from said sensor means, calculating from said output a negative camber for each of the outside wheels and a positive camber for each of the inside wheels when the vehicle is turning, and operating said adjustment means to dynamically adjust the wheels accordingly.

2. The suspension system of claim 1, wherein:

said sensor means includes a pendulum which is transversely but not longitudinally movable, to thereby detect the amount of lateral force acting upon the vehicle from the angle of suspension of said pendulum.

3. The suspension system of claim 1, wherein:

said sensor means is located proximate to the transverse center of gravity of the vehicle, to thereby accurately detect the amount of lateral force acting upon the vehicle as a whole.

4. The suspension system of claim 1, wherein:

said controller further collects statistical data regarding use of the suspension system, thereby permitting analysis of vehicle performance and driver habits.

5. The suspension system of claim 4, wherein:

said controller is constructed robustly and said statistical data is stored in a non-volatile memory so that it may be recovered and analyzed after the vehicle is crashed.

6. The suspension system of claim 1, further comprising:

alarm means for warning occupants of the vehicle; wherein said controller further operates said alarm means as turns approaching unsafe limits are attempted.

7. The suspension system of claim 6, wherein:

said alarm means includes at least one member of the set consisting of audible and visual enunciators.

8. The suspension system of claim 1, wherein:

every wheel of the vehicle has an associated said adjustment means, regardless of whether transversely opposed.

9. The suspension system of claim 1, wherein:

said adjustment means changes camber by pivoting the wheel about a pivot axis located above the rotational axis by displacing the wheel laterally at a lower point than the rotational axis.

10. The suspension system of claim 1, further wherein:

said adjustment means includes an actuator which is a member of the set consisting of pneumatic cylinders, hydraulic cylinders, electric solenoids, electric linear armature actuators, and rotary motor driven actuators.

11. The suspension system of claim 1, wherein:

the wheels include tires having rounded outer profiles to permit greater range of camber adjustment by the suspension system while still maintaining roughly equivalent wheel footprints among the wheels in the transversely opposed sets, thereby permitting greater speed of the vehicle in turns.

12. A method for controlling a suspension system of a turning vehicle having at least one set of transversely opposed wheels which may each rotate about a rotational axis, the method comprising:

sensing lateral force acting upon the vehicle;

calculating negative cambers for outside instances of the wheels and positive cambers for inside instances of the wheels based upon said lateral force; and operating adjustment means to dynamically adjust the wheels accordingly, wherein said step of operating adjustment means includes pivoting the wheel about a pivot axis located above the rotational axis by displacing the wheel laterally at a point below the rotational axis.

13. The method of claim 12, wherein:

said lateral force is sensed proximate to the transverse center of gravity of the vehicle, to thereby accurately detect the amount of lateral force acting upon the vehicle as a whole.

14. The method of claim 12, further comprising:

collecting statistical data regarding use of the suspension system, thereby permitting analysis of vehicle performance and driver habits.

15. The method of claim 14, further comprising:

storing said statistical data in a non-volatile memory in a robustly constructed vessel, thereby permitting recovery and analysis after the vehicle is crashed.

16. The method of claim 12, further comprising:

analyzing said lateral force in view of limits of operation of the vehicle; and warning occupants of the vehicle as turns approaching unsafe instances of said limits are approached.

17. The method of claim 12, wherein:

said step of calculating further calculates appropriate camber for every wheel of the vehicle; and further comprising operating individual adjustment means at said every wheel, regardless of whether transversely opposed.

18. The method of claim 12, further comprising:

maintaining roughly equivalent wheel footprints among the wheels in the transversely opposed sets by using wheels having tires with rounded outer profiles, thereby permitting greater range of camber adjustment by the suspension system and thus greater speed of the vehicle in turns.

* * * * *